United States Patent [19]

Cole et al.

[11] Patent Number: 5,042,086

[45] Date of Patent: Aug. 20, 1991

[54] METHOD AND MEANS FOR TRANSMITTING LARGE DYNAMIC ANALOG SIGNALS IN OPTICAL FIBER SYSTEMS

[75] Inventors: James H. Cole, Great Falls, Va.; Ira J. Bush, Los Angeles, Calif.

[73] Assignee: Dylor Corporation, Chantilly, Va.

[21] Appl. No.: 271,890

[22] Filed: Nov. 16, 1988

[51] Int. Cl.$^5$ .............................................. G02F 1/00
[52] U.S. Cl. ................................... 455/606; 455/611; 455/615; 358/141; 370/1; 370/3; 356/345
[58] Field of Search .............. 455/606, 615, 611, 618, 455/612, 601; 370/3, 4, 1, 12; 358/141, 142; 356/345, 349, 351

[56] References Cited

U.S. PATENT DOCUMENTS

| | | | |
|---|---|---|---|
| 3,517,334 | 6/1970 | Glatt et al. | 331/94.5 |
| 3,732,505 | 5/1973 | Freedman | 331/94.5 |
| 3,956,626 | 5/1976 | Ross | 455/611 |
| 4,236,243 | 11/1960 | Davis et al. | 455/611 |
| 4,436,425 | 3/1984 | Cole | 356/361 |
| 4,533,247 | 8/1985 | Epworth | 356/345 |
| 4,578,793 | 3/1986 | Kane et al. | 372/94 |
| 4,653,056 | 3/1987 | Baer et al. | 372/27 |
| 4,656,635 | 4/1987 | Baer et al. | 372/27 |
| 4,694,276 | 9/1987 | Rastegar | 356/349 |
| 4,701,928 | 10/1987 | Fan et al. | 372/68 |
| 4,701,929 | 10/1987 | Baer et al. | 372/71 |
| 4,730,335 | 3/1988 | Clark et al. | 372/98 |
| 4,731,795 | 3/1988 | Clark et al. | 372/107 |
| 4,734,912 | 3/1988 | Scerbak et al. | 372/27 |
| 4,749,277 | 6/1988 | Eichen et al. | 356/349 |
| 4,752,132 | 6/1988 | Pavlath | 356/345 |
| 4,768,186 | 8/1988 | Bodell | 370/3 |
| 4,770,535 | 9/1988 | Kim et al. | 356/345 |
| 4,805,235 | 2/1989 | Henmi | 455/611 |

OTHER PUBLICATIONS

A. Dandridge and L. Goldberg, "Current Induced Frequency Modulation in Diode Lasers," Electronic Lett. 18, pp. 302-303, (2-1982).
A. Dandridge, "Zero Path-Length Difference in Fiber Optic Interferometers," Journal of Lightwave Technology LT-1, pp. 514-516, (9-1983).
D. G. Fink, Ed. Electronic Engineer's Handbook, "Angle Demodulators," by N. R. Powell, pp. 14-22 to 14-28, McGraw-Hill Book Company, New York, 11-1988.
A Dandridge, A. B. Tveten and T. G. Giallorenzi, "Homodyne Interferometric Demodulation," IEEE Journal of Quantum Electronics QE-18, pp. 1647-1697, (10-1982).
J. H. Cole, B. A. Danver and J. A. Bucaro, "Synthetic Heterodyne Interferometric Demodulation," IEEE Journal of Quantum Electronics QE-18, pp. 604-697, (4-1982).
K. P. Koo, A. B. Tveten and A. Dandridge, "Passive Stabilization Scheme for Fiber Interferometers Using (3×3) Fiber Directional Couplers," Applied Physics Lett. 41, pp. 616-618, (10-1982).
R. A. Becker, "Traveling Wave Electro-Optic Modulator with Maximum Bandwidth-Length Product," Appl. Phys. Lett. 45, pp. 1168-1170, (12-1984).

Primary Examiner—Donnie L. Crosland
Attorney, Agent, or Firm—Reed Smith Shaw & McClay

[57] ABSTRACT

A method and apparatus is provided for transmitting a broad dynamic range of rf or microwave signals from a source of such signals, e.g., an antenna, to a remotely located receiver, e.g., a television or radar receiver, by phase modulating a beam of light, transmitting the modulated optical signal over a substantial distance using fiber optics, detecting and demodulating the optical signal to recover the rf or microwave analog signal, and using the recovered signal at the output receiver. Conversion of the analog information into a modulated optical signal is obtained by employing interferometers and placement of the modulated signals in quadrature to linearize the output. Apparatus using the method to distribute rf or microwave analog information to a plurality of remotely located receivers is taught as is apparatus for bidirectional movement of rf or microwave analog signals using the modulation techniques of the method from at least two sources of analog signals which are remoted from each other.

25 Claims, 9 Drawing Sheets

INTENSITY MODULATION

PHASE MODULATION
IN THE LINEAR REGION

PHASE MODULATION IN THE NON LINEAR REGION

DIAGRAM OF PHASE MODULATION AS A FUNCTION OF INTENSITY

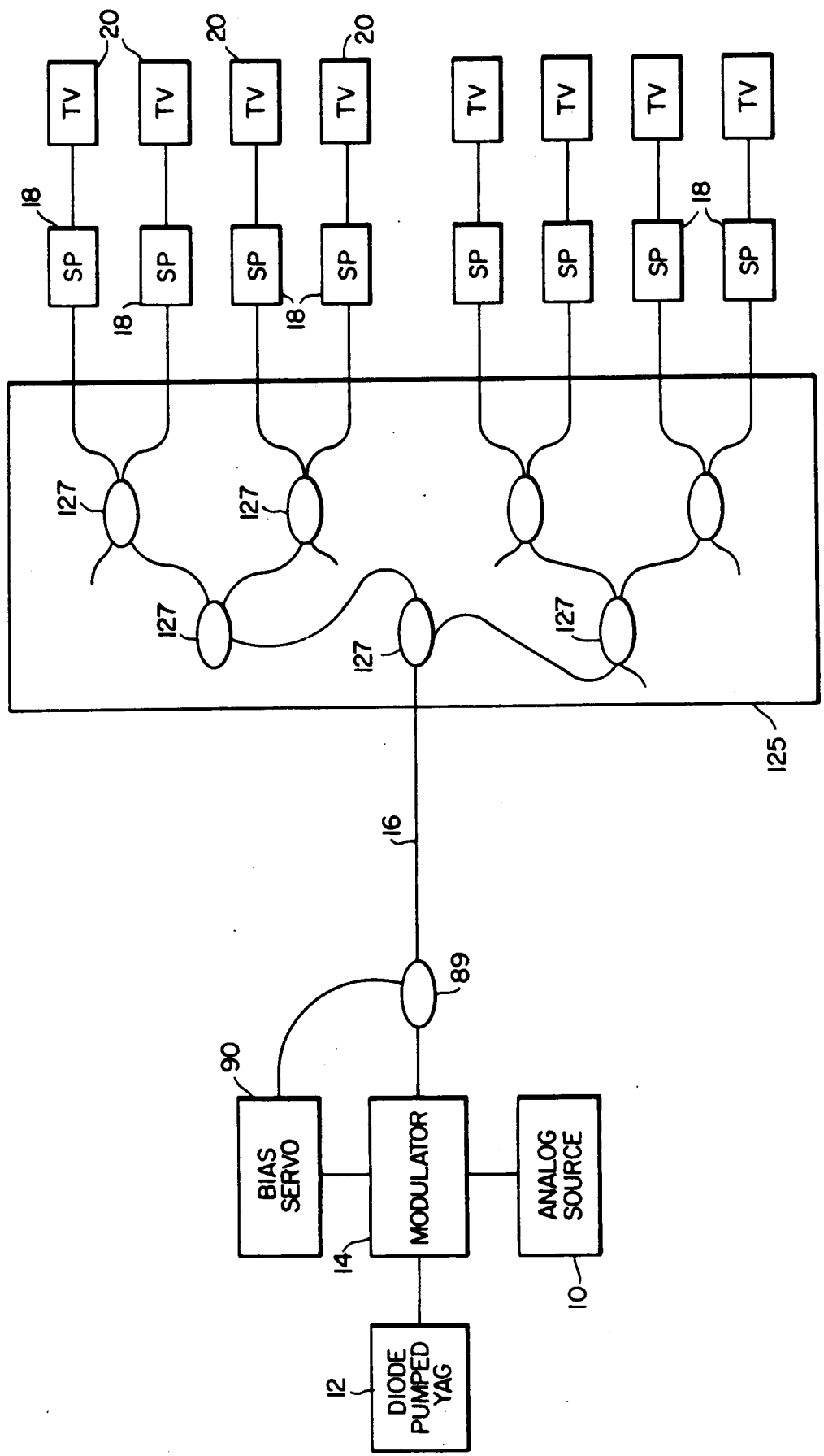

METHOD AND MEANS FOR TRANSMITTING LARGE DYNAMIC ANALOG SIGNALS IN OPTICAL FIBER SYSTEMS

BACKGROUND OF THE INVENTION

This invention relates to a new and improved method and system for transmitting an analog signal such as a signal containing information in the microwave spectrum using fiber optics to a utilization device or devices. The method and system of the invention provides for much increased performance in the dynamic range of analog information which may be transmitted from a source of analog signals to a remotely located utilization device.

Conventional coaxial cable systems for transmitting a signal from, e.g., an antenna, to, e.g., a receiver, inherently are subject to large line losses when transmitting analog information at microwave and rf frequencies. A typical loss figure for a conventional coaxial system is 600 dB per 100 meters at 10 GHz. The distance between the analog signal source and receiver or receivers must, therefore, be kept small or appropriate amplification must be provided. These restrictions effectively prevent the use of coaxial systems for long-distance transmission purposes.

Optical fiber systems have also been used to transmit high frequency analog signals and they offer the significant advantage of low line loss over cable systems. A typical loss figure for an optical fiber system is 0.5 dB per 1000 meters, and the maximum usable distance between the signal source and receiver may be as high as 10 to 30 kilometers without the necessity for amplification. Another significant advantage offered by an optical fiber system is that the costs are much lower than those for a coaxial cable system.

The usual approach to the transmission of analog signals using a fiber optic system is to use the microwave signal to intensity modulate light from a source of coherent light such as a laser. These systems or approaches, however, involve a severe limitation on the dynamic range of the system. The noise floor is limited by the intensity noise created by the source, about $-130$ dB/$\sqrt{Hz}$ to the laser output for a typical device. Normalized to a 1 MHz bandwidth, this is equivalent to a $-70$ dB noise floor related to the laser output. Thus, if 100% intensity modulation depth is induced only 70 dB of dynamic range is achievable. Accordingly, fiber optic systems signal transmission of the kind referred to are limited in the dynamic range of high frequency signal information they are capable of transmitting to a utilization device.

SUMMARY OF THE INVENTION

It is a principal object of this invention to provide a method for transmitting high frequency analog signals in the rf and microwave frequency spectrums over relatively long distances while preserving the dynamic range characteristics of the signals. Practical applications of the method include a system for transmitting signal information obtained on radar antennas or television antennas to remotely located receivers. Another practical application of the method includes a communications system for bidirectional transmission of video signals.

It is another principal object of the invention to provide signal transmission apparatus designed to perform the method of the invention.

The objects of this invention are realized by a method and various apparatus which apply the microwave or rf analog signal to produce a phase and amplitude modulated optical signal that includes substantial portion if not all of the dynamic range of the analog signal, transmitting the phase or amplitude modulated signal to a remote location using a fiber optic transmission system, using the optical signal at the remote location to reproduce an analog signal proportional to the original microwave or rf signal, and applying the analog information to a utilization device or devices.

Apparatus used to perform the method of the invention include a source of analog signals such as a radar antenna operating in conjunction with a source of light, e.g., a semiconductor or diode pumped solid state laser to produce an optical signal that is phase or amplitude modulated by the analog information. The modulated signal is transmitted by an optical fiber system which may include multiple optical paths to a signal processor which in its simplest form includes a photo detector outputted to a utilization device. In more complex form, the signal processor may include band pass filtration connected to receive an amplified signal from the photo detector and connected on the output side to a differentiate cross-multiply circuit before utilization. In addition, the apparatus may employ multiple optical paths, each of which contains some portion of the analog information as an optical signal and each path may have photo detector coupled to signal processing equipment as is appropriate.

With appropriate powered lasers, the apparatus of the invention may be expanded to drive a plurality of receivers, e.g., television receivers, and it may also be made multidirectional as in a communications system employing television receivers and cameras.

BRIEF DESCRIPTION OF THE DRAWINGS

FIG. 8 is a detailed diagram showing a multiplexer with power combiner used in the communications system shown in FIG. 7.

DETAILED DESCRIPTION OF THE INVENTION

As noted above, known fiber optic analog signal transmission systems use the information signal to vary the intensity or amplitude of a source of light, e.g., a diode pumped laser, and are limited in the dynamic range of the signal which can be transmitted by the noise intensity associated with the source. The method of this invention avoids this limitation by using the analog information and the optical characteristics of light to produce phase modulated signals which may be transmitted by fiber optics or recombined and then transmitted by optical fibers.

Figure 1:
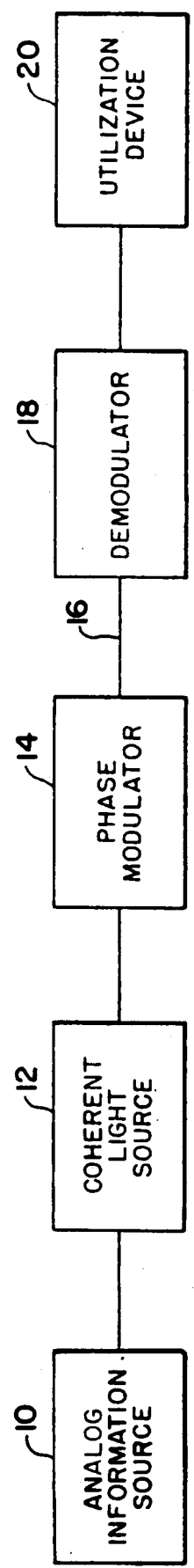
FIG. 1 is block diagram of an optical fiber system incorporating the features of the invention.

Referring now to FIG. 1, a source of analog information 10, such as an antenna receiving microwave or rf signals, may be connected directly to a laser 12 which, e.g., may be a distributed feed back laser operating at 1.3 microns. A microwave carrier signal of large amplitude so as to generate a large second harmonic at the output of the phase modulator is also applied to the laser. The output of the laser is an optical signal that is frequency modulated with the analog information. This optical signal containing the information of interest may be applied to a modulator 14 to produce an optical signal that is phase modulated with the information of interest.

Figure 2:
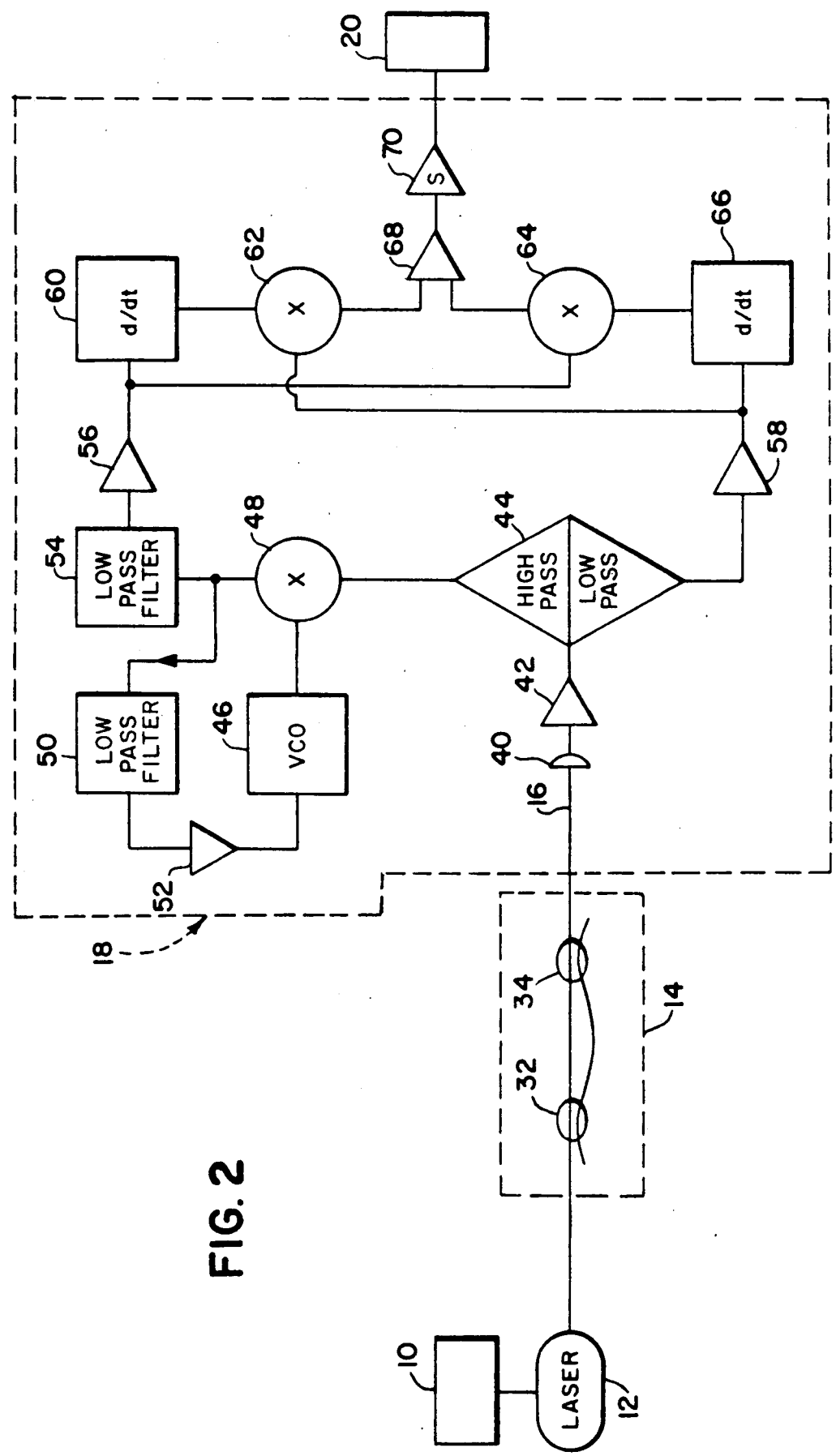
FIG. 2 is a block diagram of the apparatus of the invention using mismatched phase modulation and demodulator which may be used to process the signal.

A modulator 14 of the kind that may be used in the method is a mismatched pathlength interferometer as shown in FIG. 2 of the drawings. It may consist of two fiber-optic couplers 32 and 34 constructed to operate at the frequency of the laser. Fiber-optic coupler 32 divides the optical signal beam into two components, and fiber-optic coupler 34 coherently recombines the two components to produce a phase-modulated optical signal.

In this embodiment of the apparatus, the modulation phase shift $\phi$ is given by:

$$\phi = 2\pi D\nu/c \qquad (1)$$

where $\pi = 3.14159$, D is the optical path length difference (OPD) in the interferometer, $\nu$ is the variation in frequency of the laser due to the microwave modulation, and c is the speed of light. In the presence of a high frequency carrier, w, the AC output of the interferometer 14 is a composite signal defined as:

$$S(t) = 2AB[J_0(X_A)\cos(Y+Z) - J_1(X_A)\sin(wt)\sin(Y+Z) + \ldots] \qquad (2)$$

where A and B are the amplitudes of the two component optical beams whose polarizations are identical, $J_0$ and $J_1$ are Bessel functions, $X_A$ is the amplitude of the carrier signal at angular frequency w, Y is the phase signal of interest, and Z is the phase variation due to low frequency thermal effects and any static phase difference. Reference to FIGS. 3A through 3D demonstrates that phase modulation has a significant advantage over intensity modulation for transmitting analog signal information.

FIG. 3 demonstrates how phase modulation relates to the optical intensity.

Figure 3A:
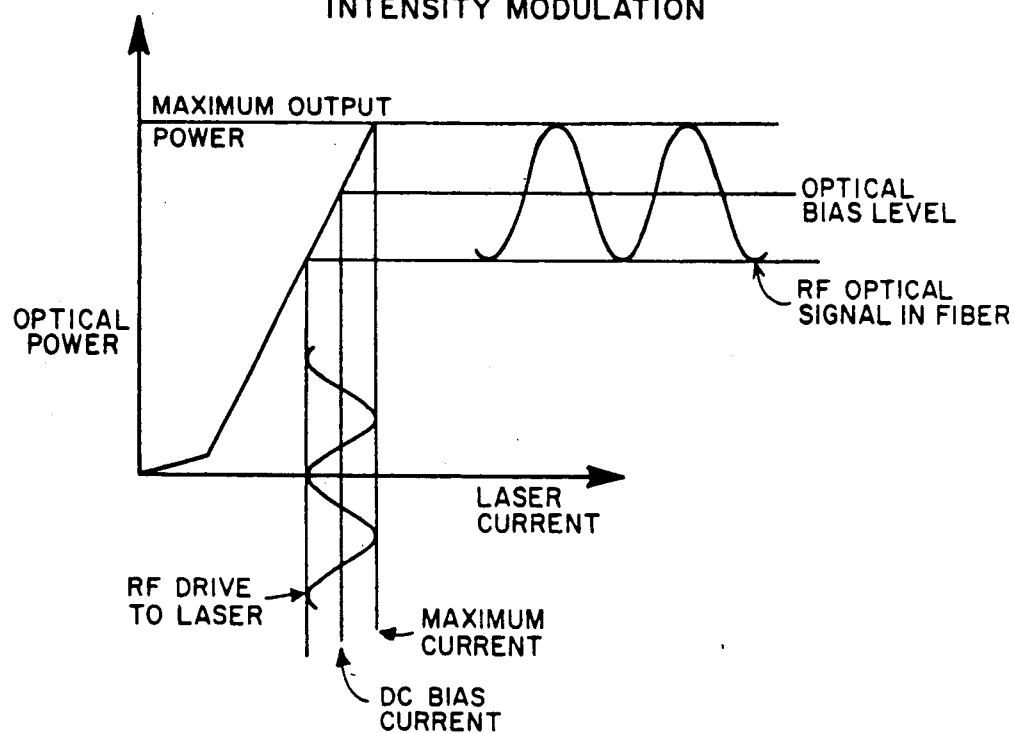
FIG. 3A is a graphical representation of optical output power as a function of laser current for linear intensity modulation.

The use of linear intensity modulation is shown in FIG. 3A where the maximum laser output power provides a limit on the extent of modulation. This is also true for phase modulation, although 100% modulation depth can be obtained at lower drive currents, and large dynamic range can be achieved by increasing the drive current beyond that point.

Assume, e.g., a maximum laser output power of 5 mW. If the bias is set at 3 mW, 100% intensity modulation results in a power variation, I=4 mWpp. An input analog signal current of 12 mApp (−0.5 dBm) is required in order to achieve this modulation level for a commercially available laser. If the relative intensity noise of the laser is −130 dB the dynamic range is 70 dB for a MHz bandwidth.

Figure 3B:
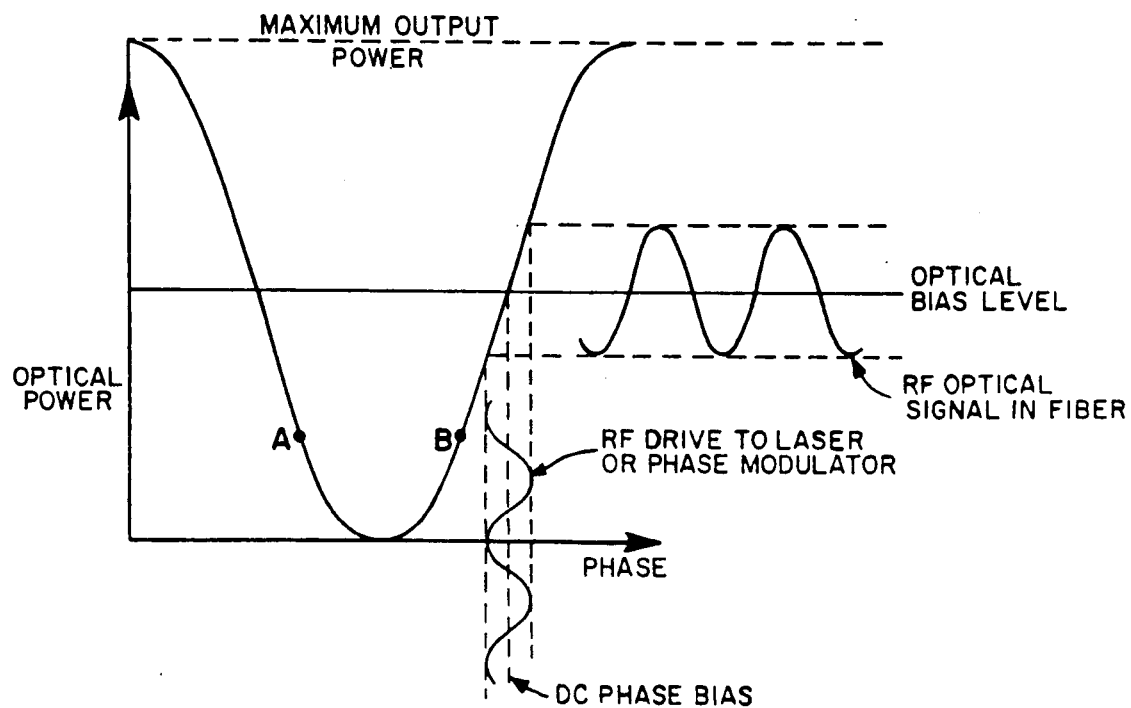
FIG. 3B is a graphical representation of the optical power output as a function of phase for phase modulation in the linear region.

FIG. 3B illustrates phase modulation in the linear region with an output that is very similar to that obtained from intensity modulation.

For the same laser used in the example above, the bias is set at 4 mW, allowing a 3 mApp (−12.5 dBm) analog signal current excursion before the maximum 5 mW output power is reached. Comparing the required analog signal drive powers for conventional intensity modulation and for phase modulation it is clear that the advantage rests with the phase modulation process. With a typical laser modulated at, e.g., microwave frequencies, the optical frequency shift is 0.15 GHz/mA. Using Equation 1 with a 50 cm OPD, a phase shift of 1.6 rad/mA can be achieved. Realizing from FIG. 3B that in the linear region $I = \phi P_\phi$ and assuming a −130 dB relative intensity noise limit a dynamic range of 77 dB for a 1 MHz bandwidth is achieved.

Figure 3C:
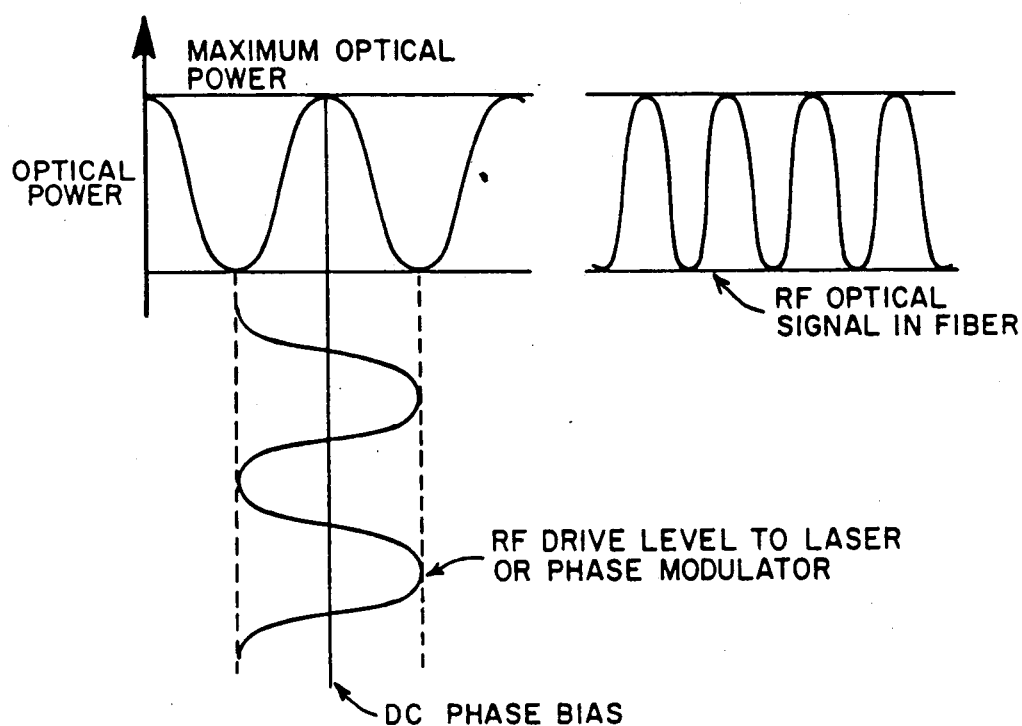
FIG. 3C is similar to FIG. 3B showing phase modulation in the non-linear region.

FIG. 3C shows that when the phase modulation exceeds the maximum power level, the non-linear nature of this process provides a foldover in frequency. For the static phase shift shown in this Figure a frequency doubling occurs. A signal processor, as will be discussed below is required to linearize the output. In principle, by driving the laser to the maximum allowable current, approximately 10 dB (total 87 dB) additional dynamic range can be achieved, however, the signal when processed or demodulated to obtain the analog information of interest should incorporate techniques to cancel the direct intensity modulation term. This can be as simple as providing cross coupling between the two separate processing paths.

Figure 3D:
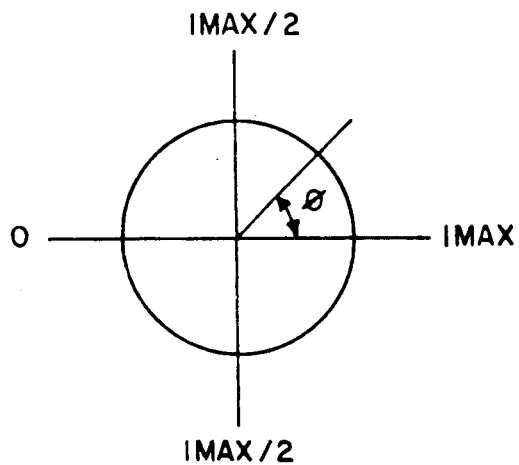
FIG. 3D is a diagram of phase modulation as a function of intensity.

The use of non-linear phase modulation allows for increased dynamic range through the repetition of the circular functions as shown in FIG. 3D.

A signal processor 18 that may be used to demodulate the signal S(t) is shown in FIGS. 1 and 2 coupled to the modulator 14 on its input side by a fiber optic 16 and coupled on the output to an approximate output device 20, e.g., radar receiver. The optical signal path provided by the fiber may exceed 10 km as in intensity modulated fiber optic transmission systems.

As seen in FIG. 2, the processor 18 includes a photodetector 40 connected to convert the modulated optical signal into an electrical signal which, if necessary, may be amplified by an amplifier 42 and applied either to signal processing circuits or applied directly to the utilization device 20 as determined by the end use application, type of light source used and the circuitry employed by the modulator.

In the application shown in FIG. 2, the output of the amplifier 42 is the electrical representation of the signal S(t) and is applied to high/low band pass filter circuits 44 to divide the signal into high and low frequency components.

The low frequency component is given by the formula:

$$S_1(t) = 2ABJ_0(X_A)\cos(Y+Z) \qquad (3)$$

The high frequency component includes the carrier signal and is represented by:

$$S_2(t) = 2ABJ_1(X_A) \sin(Y+Z) \sin(wt) \quad (4)$$

As will be seen, the analog signal Y, i.e., the signal of interest, is contained in both high and low pass components.

As shown in FIG. 2, the high pass component is mixed with a signal produced by a local oscillator 46 in a mixer 48 where the oscillator 46 operates at the carrier frequency in the example given, w. A phaselocked loop comprising a low pass filter 50 and amplifier 52 may be connected from the output of the mixer 48 to stabilize the local oscillator.

The mixer 48 is connected to a second low pass filter 54 to produce a baseband output:

$$S_2 = -ABJ_1(X_A)\sin(Y+Z) \quad (5)$$

This signal may be passed through an amplifier 56, and is in quadrature with the signal $S_1(t)$ which may be passed through an amplifier 58 connected to the low pass side of the filter 44. It should be noted that the use of a baseband channel minimizes the required frequency response of the signal processor providing maximum dynamic range and bandwidth performance.

The outputs of the amplifiers 56, 58 are connected in quadrature to a conventional differentiate cross multiply circuitry. Thus, the amplifier 56 provides input to a differentiator 60 which on its output is connected to a mixer 62 which is also connected to receive the low pass component from the amplifier 58. Similarly, the high pass component is applied to a mixer 64 and there mixed with the output of a differentiator 66 receiving as its input a signal from the low pass amplifier 58. The signals from the mixers may be applied as input signals to a differential amplifier 68 operating into an integrator 70 to produce a composite signal (Y+Z).

The analog signal of interest (Y) is frequency separated from extraneous low frequency effects (Z). The signal Y is, therefore, made available at the remote location to drive a utilization device 20 which, as previously stated, may be a radar or television receiver or other high frequency utilization device.

The apparatus as described thus far performs well at relatively strong signal strengths. However, at relatively low strength, phase noise produced either by the source or the mismatched interferometer can be a problem. This problem may be overcome by substituting a matched pathlength modulator for the modulator described above.

Figure 4:
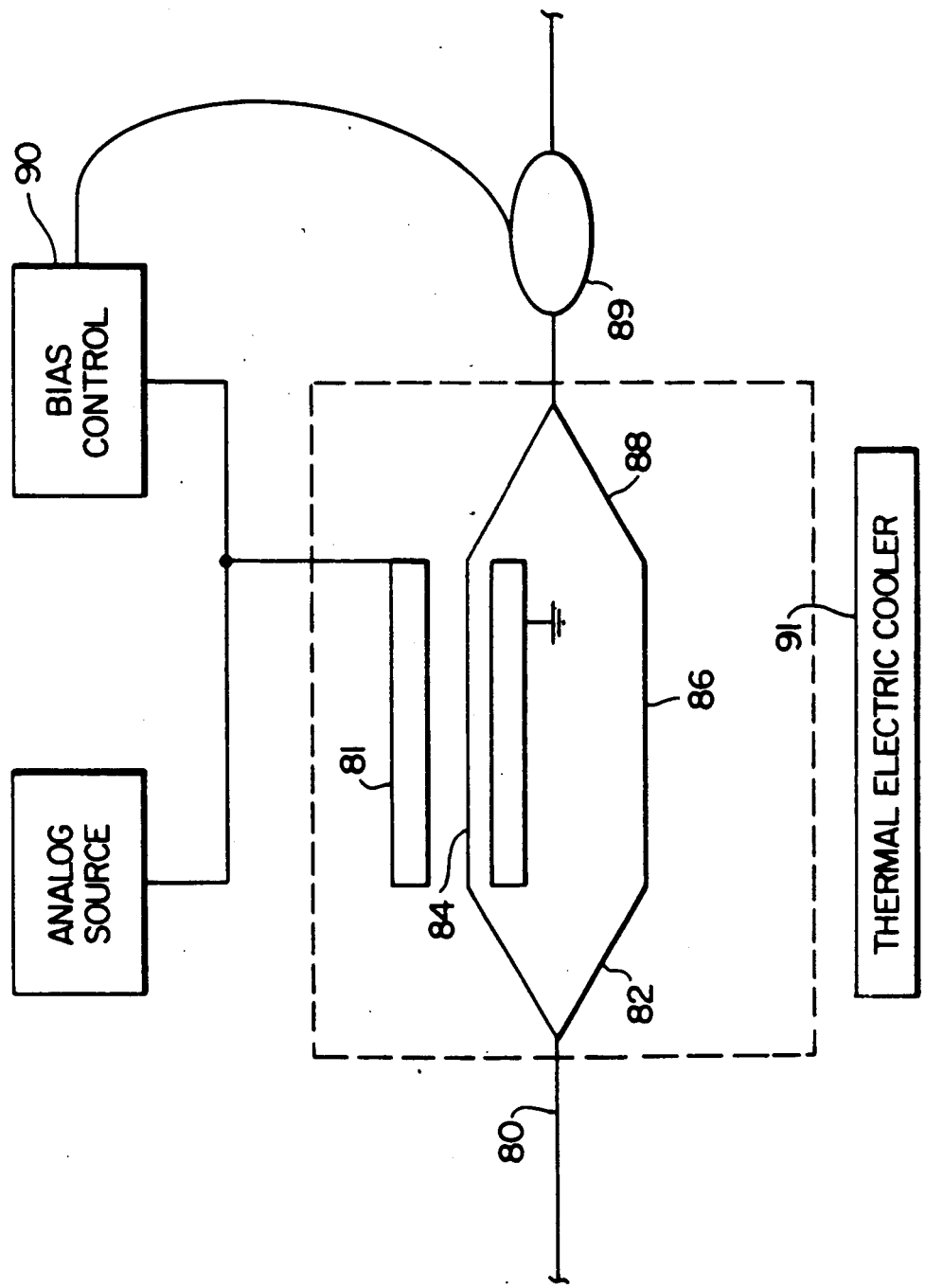
FIG. 4 is a schematic of another modulator and associated circuits which may be used in the method taught by the invention.

Referring to FIG. 4 of the drawings, a Mach-Zehender interferometer is shown coupled to receive a light beam on a waveguide 80 with the analog source applied as an input to electrode 81. This source may also have a microwave carrier signal or laser amplitude applied to it. The light beam is split by a splitter/combiner 82 and applied straight waveguide sections 84 and 86. Either or both of these sections may be modulated with the rf or microwave analog signal to produce a phase shift between the optical beams in each of the sections 84 and 86.

The optical signals can then either be recombined as by using a combiner/splitter 88 to produce a signal of the kind discussed above which signal can be applied to the fiber optic 16 as previously described. It should be appreciated that instead of recombining the optical signals at the modulator end, each of the phase separated signals could be transmitted by separate fiber optics to the demodulator 18 and there optically recombined.

Transmitting the phase separated signals individually enhances the security of the system. It will be appreciated, however, that the length the fibers in each of the two paths will need to be closely matched to avoid phase or intensity noise. It will also be appreciated that differences in the path lengths of the two fiber transmission system can generate a phase modulated signal in the event the analog signal is used to frequency modulate a distributed feed back laser as discussed above. In this situation, the differences in path lengths may be on the order of a few centimeters to approximately fifty centimeters.

Whether the optical signals are recombined at the modulator or demodulator ends, a feedback bias control might be applied to stabilize the signal. As shown in FIG. 4, the signal from the combiner/splitter 88 may be applied to an optical fiber coupler or chip 89 to obtain a small portion of the optical signal which may be used in a closed servo loop. The split off portion of the optical signal may be detected and converted to an electrical signal used as a pick-off signal for electronic bias control 85 fed back to Mach-Zehender interferometer. The advantage of this apparatus is that phase noise from the light source is eliminated thus permitting the use of low coherence sources in the method. Most of the light from the output, however, should be propagated through fiber optics to the demodulator or signal processor 18 described above. Additional stabilization may be obtained by maintaining the operating temperature of the interferometer. For example, a thermal electric cooler 87 could be attached to the modulator substrate to provide a stable operating temperature.

Figure 5:
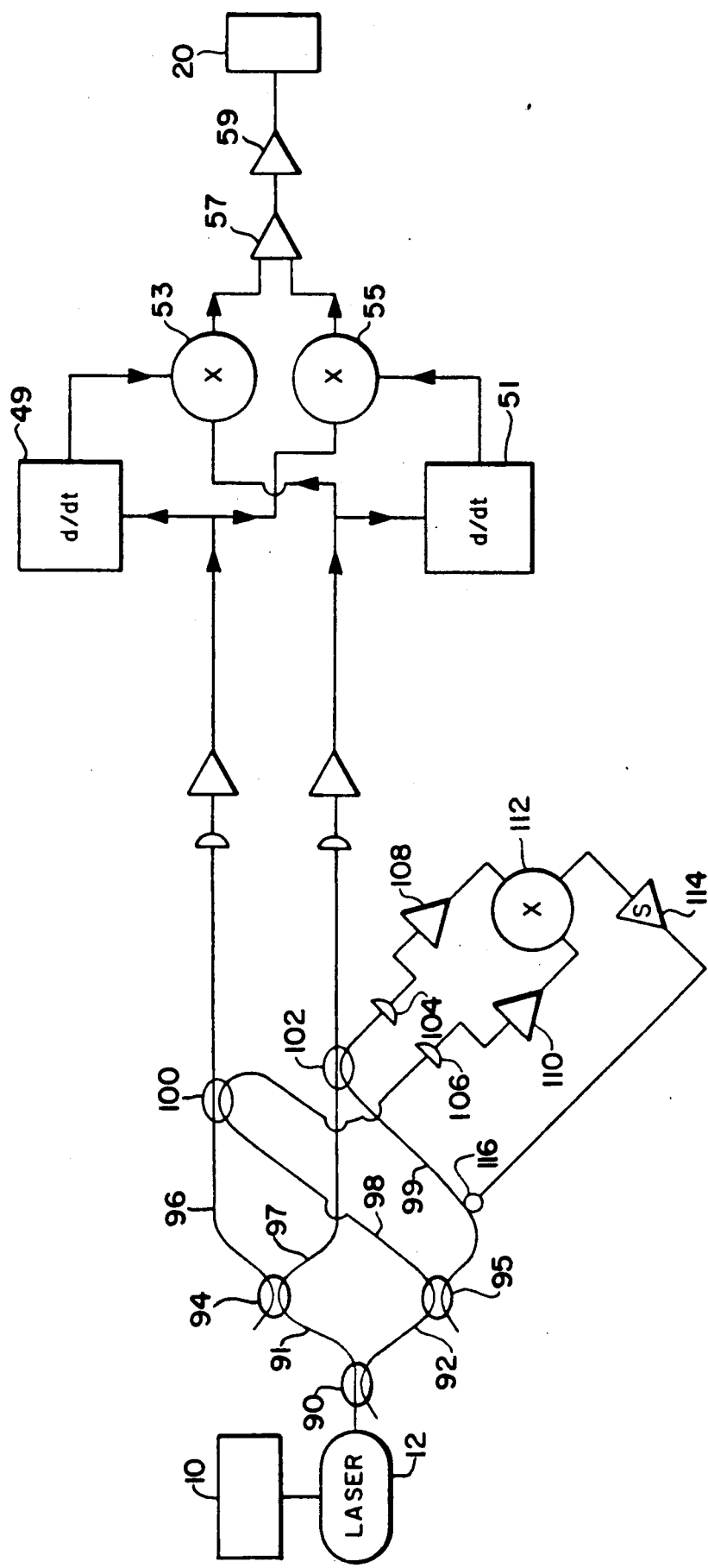
FIG. 5 is a diagram of an embodiment of the invention showing two or more optical signal paths to develop optical signals in quadrature.

As discussed thus far, a high frequency carrier was applied to the laser to generate quadrature signals. An alternate approach is to produce the quadrature condition statically or quasi-statically. A quasi-static configuration is shown in FIG. 5 of the drawings. In this embodiment, the laser 12 is frequency modulated by the source of rf or microwave signals 10, and light from the laser is launched into an optical fiber coupler 90 having two outputs, 91 and 92.

A fiber phase modulator may be constructed by wrapping the fiber 92 on a piezoelectric cylinder which may be driven by a low frequency source, e.g., a source operating at a few kHz, to provide a pilot tone for an AC servo loop.

The light in the fibers 91 and 92 is further divided using couplers 94 and 95 into fibers 96 and 97 on the output side of coupler 94 and fibers 98 and 99 on the output side of the coupler 95. These four beams may be coherently combined to form separate interferometers. Thus, fibers 96 and 98 may be coupled to combine light signals in a coupler 100, to form one interferometer, and fibers 97 and 99 may be coupled to combine light in a coupler 102 to form another interferometer.

The pilot tone generator formed by wrapping the fiber optic 92 is located to place a pilot tone on each of the fibers 98 and 99, and these tone signals may be inputted to photodetectors 104 and 106 respectively. The respective signals generated by the pilot tones can then be amplified with amplifiers 108 and 110 respectively and combined in a mixer 112 operating as a phase detector to determine the relative phase between the two pilot tone signals. The output of the mixer 112 may be integrated in an integrator 114 to generate a dc voltage for a fiber modulator 116.

With appropriate transfer characteristics in this loop, the output of the integrator 114 modulates the fiber modulator 116 in a manner which locks the two interferometers in quadrature. The fiber optics 96 and 97 are also in quadrature due to the optical phase locked loop. These signals may then be transmitted to the differentiate cross multiply circuits in the demodulator 18 as previously described.

The systems as described can be further refined and improved in both their optical transmission capabilities and in the dynamic range of information that can be transmitted to remote locations by using a high power low noise lasers as the source of light. For example, a diode pumped YAG laser such as those made by Amoco Laser, has inherently low noise with relative intensity noise ($-150$ dB relative to the outpower of the laser). These sources enhance the system such that it may be used in signal distribution and telecommunication systems.

Figure 6:
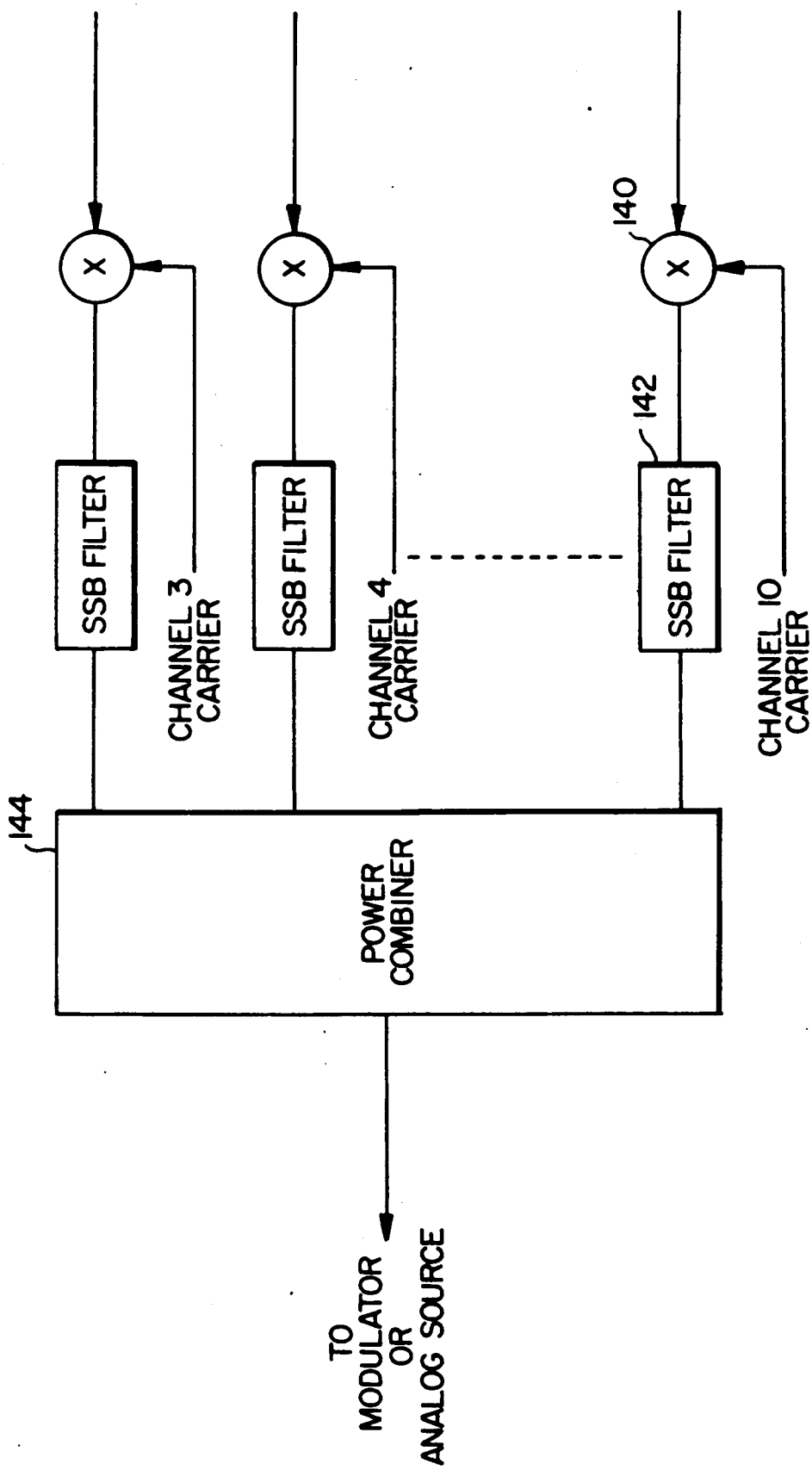
FIG. 6 is a diagram of a yet another embodiment of the invention showing a multiple output system.

Referring now to FIG. 6 of the drawings, a system for distributing an analog signal, e.g., television signals received on an antenna, to a plurality of utilization devices 20, e.g., television receivers, is shown. A high power source of light is used, e.g., an Amoco Laser YAG, together with a Mach-Zehender interferometer to produce a phase or intensity modulated signal in the fiber optic 16. This signal may be coupled to a fiber distribution assembly 125 comprised of passive couplers 127 connected in a tree to, split the information on the primary transmission fiber 16 into eight output signals each of which is connected to, demodulator or signal processor 18 used as previously described to drive a receiver 20.

This system has high band width capacity and large distribution capability. It permits, therefore, high channel capacity in television system with low harmonic distortion. The system can be made bidirectional by adding appropriate circuitry in the signal processor and in the return direction towards the analog source 10.

Figure 7:
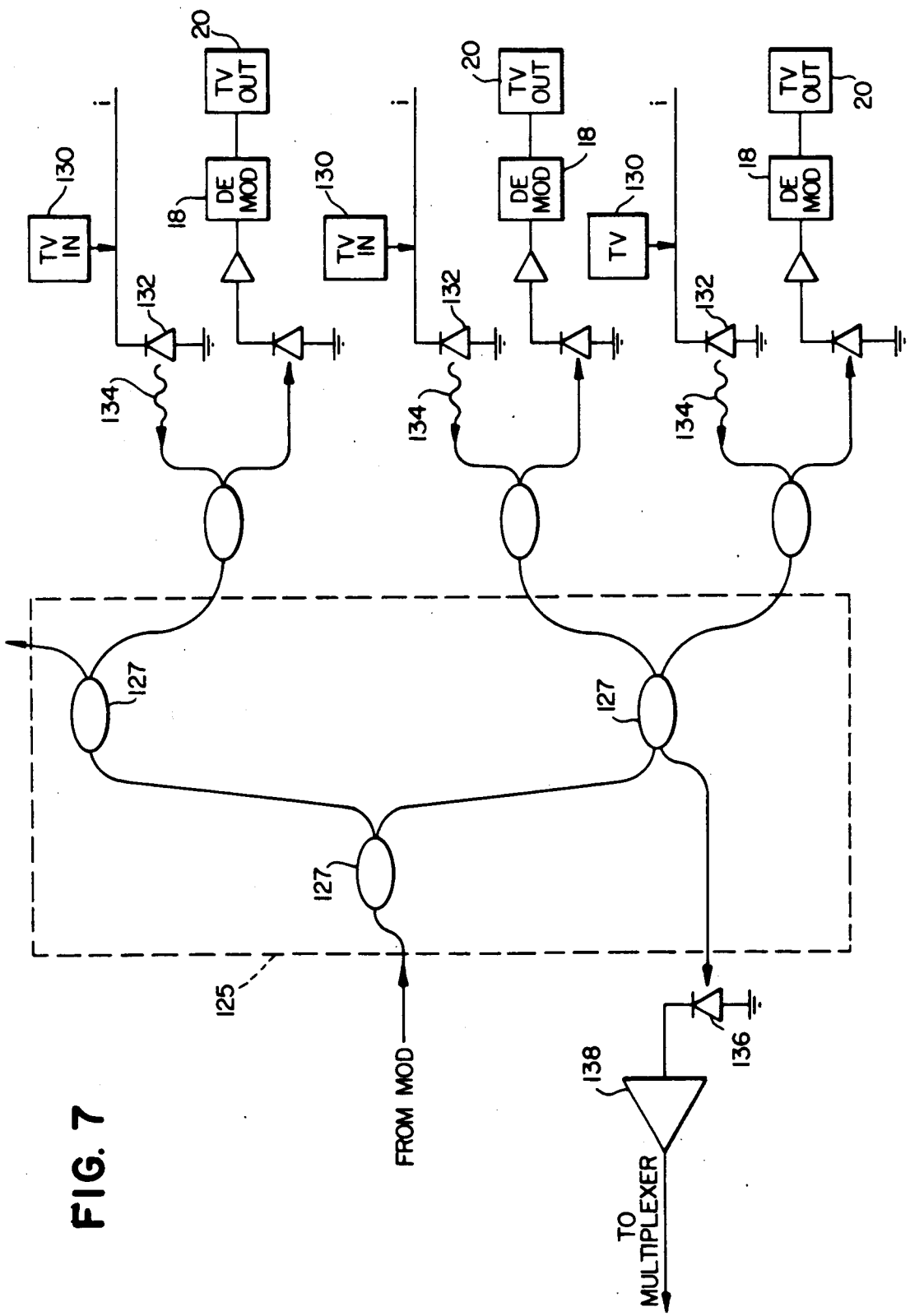
FIG. 7 is a diagram showing details of a bidirectional communications shown.

Referring to FIG. 7, a source of analog signals such as a television camera 130 may be connected as an input to a source of light 132, such as a light emitting diode, to produce an optical signal 134 modulated with the information from the camera. Cameras and LEDs may be associated with each signal processor 18 such that in the system described, at least eight parties may be tied in from the utilization end of the system. The system can, however, be expanded to allow up to 27 conversations simultaneously with up to 126 viewers.

A modulated signal 134 from an LED 132 may be coupled back to the passive distribution system 125 by using previously unused ports in the couplers 127. These ports can be used to transmit the modulated optical signals using fiber optics to receiving elements at the remote location, i.e., at the location of the source 10, which elements comprise photo detectors 136 and appropriate amplifiers 138 for converting the optical signals to electrical signals containing the information originally produced by the cameras.

Each amplifier 138 may be connected as an input to a multiplexer which as shown in FIG. 8 of the drawings comprises a plurality of mixers 140 each coupled to also receive an appropriate television channel carrier signal. The carrier signal in each input is modulated with the information from the amplifier, and the modulated carrier may then be filtered in a single side band filter 142 to produce the appropriate bandwidth. All of the carrier channels may then be combined in a power combiner 144 applied on its output to the analog source 10 or to the modulator 12 depending on the kind employed in the system.

In this regard, it should be noted that the use of wavelength multipliers, where the optical splitting ratio is wavelength dependent, will improve the optical efficiency of the system over 3 dB splitters. Fiber devices for the system are commercially available, and in the system described, the wavelength form the LEDs may, e.g., 1.275 microns with the diode pumped solid state laser (YAG) operating at 1.319 microns.

What is claimed is:

1. Signal transmission apparatus for transmitting a broad dynamic range of microwave or rf analog signals to remotely located utilization apparatus comprising:

a source of light driven by a carrier oscillator and coupled to a microwave or rf analog signal source to produce an optical signal frequency modulated with the information from said analog signal;

phase modulator means optically coupled to said source of light to produce optical signals phase modulated with said analog information in quadrature;

signal processor means remotely located from said phase modulator means for processing optical signals to recover said analog information as electrical signals;

optical fiber transmission means connecting the phase modulator means with the signal processor means including means for combining said phase modulated signals; and utilization means connected to said signal processor means for using the analog information.

2. Signal transmission apparatus according to claim 1 wherein said signal processor means comprises:

demodulator means to detect the optical signal and convert same to an electrical signal containing the analog information;

bandpass filtration connected to said demodulator means for producing electrical signals containing the analog information in quadrature; and differentiate cross multiple means connected to said bandpass filtration means to recover the analog information from said quadrature signals.

3. Signal transmission apparatus for transmitting a large dynamic range of microwave or rf analog signals to remotely located utilization apparatus comprising:

a source of light driven by a carrier oscillator and coupled to receive a microwave or rf analog signal from a source of such signals to produce an optical signal frequency modulated with the information from said analog signal;

phase modulator means optically coupled to said source of light including light splitter and coupling means to produce at least two phase modulated optical signals that are in quadrature, each containing said analog information;

signal processor means remotely located from said phase modulator means for processing said phase modulated optical signals in separate quadrature parts to recover said analog information as in electrical signal which includes the large dynamic range;

optic fiber transmission means connecting said phase modulator means and said signal processor means; and utilization means connected to said signal processor means for using the analog information.

4. Apparatus for bidirectional transmission of microwave rf signals between remotely located analog sources of such signals and utilization apparatus comprising:

(a) a first source of analog signals, a high power diode pumped laser, and phase modulator means optically coupled to receive a beam of light from said laser and electrically coupled to phase modulate a portion of said light beam relative to the remaining portion of said light, to produce a first optical signal intensity modulated by said analog information;

(b) signal processor means including utilization means for detecting optical signals and demodulating them to recover analog information from said first source of analog signals, a second source of analog signals, and a second source of light connected to produce a second optical signal modulated with the analog information from said second source;

(c) signal conversion means for detecting said second optical signal and applying same as an analog signal to said first analog source; and (d) optical signal transmission means connecting said phase modulator means and said signal processor means to transmit said first optical signal to said utilization means for use thereby and for transmitting said second optical to said signal conversion means for application to said first analog source.

5. A method for bidirectionally transmitting a large dynamic range of rf or microwave analog signals between at least two sources of such analog signals, which sources are remotely located from each other, comprising the steps of:

(a) using a matched path modulator and a source of light to produce an optical signal that is phase modulated in quadrature with the rf or microwave analog signal from one of said sources;

(b) transmitting the optical signal using fiber optics and couplers to a remote location and converting the optical signal at said location into electrical signals in quadrature and processing said electrical signals to recover the broad dynamic range analog information to drive at least one utilization device;

(c) locating the second source of analog signals in proximity to the utilization device and using the second source to generate in quadrature optical signals modulated with the analog information;

(d) applying the optical signals thus obtained to the fiber optics couplers to transmit the signals back to the location of the first source of analog signals, and converting and processing the signals for utilization.

6. A method for transmitting a large dynamic range of microwave or rf analog signals over a relatively long distance to remotely located utilization means comprising the steps of:

(a) using an analog signal to phase modulate a light beam to produce an optical signal in quadrature containing analog information;

(b) transmitting the optical signal using fiber optics to remotely located utilization means; and (c) converting the optical signal to recover the analog information as an electrical signal and using the electrical signal to drive said utilization means.

7. The method according to claim 6 in which step 6(a) comprises the further step of applying a coherent light beam and the analog signal as inputs to a matched path optical modulator to produce the modulated optical signal.

8. The method according to claim 7 wherein thermal stabilization is provided to the modulator to prevent drift in the optical signal.

9. The method according to claim 7 wherein the modulated optical signal is transmitted as a plurality of phase modulated signals in, each of which is separately transmitted by a fiber optic for conversion at the receiving end.

10. The method according to claim 7 wherein the output signals from the modulator are combined to produce at least one intensity modulated signal for transmission on the fiber optics.

11. The method according to claim 7 wherein the analog signals are applied to drive the matched path modulator into nonlinear operation to produce harmonics containing the analog information.

12. The method according to claim 7 wherein the analog signals are applied to drive the matched path modulator into nonlinear operation and wherein feedback predistorted or closed loop signals are applied to the modulator to linearize the microwave or rf analog information.

13. The method according to claim 11 or 12 wherein the signal conversion step of claim 6 includes the processing of the converted phase modulated quadrature signal as high and low pass electrical components to thereby provide the large dynamic range.

14. The method according to claim 6 wherein step 6(a) includes using a high power source of coherent light to produce said optical signal and in which the signal is split into a plurality of optical signals each of which contains the broad dynamic range of the analog signal.

15. The method according to claim 6 wherein the light beam is generated by a source of coherent light, the microwave or rf analog signals are applied to the source of coherent light to produce a frequency modulated optical signal, and wherein a modulator is used to convert the frequency modulated optical into a phase modulated optical signal in quadrature.

16. The method according to claim 15 wherein a carrier signal is applied to the source of coherent light.

17. The method according to claim 15 or 16 wherein the signal conversion step of claim 6 includes processing of the quadrature signal as high and low pass electrical components to linearize the output thereby providing a large dynamic range of the analog signal.

18. Signal transmission apparatus for transmitting a broad dynamic range of microwave or rf analog signals to remotely located utilization apparatus comprising:

a source of analog signals;

a source of light;

phase modulator means coupled on one input to receive said light and on another input to receive said analog signals to produce phase modulated optical signals which contain the analog information in quadrature as outputs;

signal processor means for detecting optical signals and converting said optical signals to electrical signals in quadrature containing the analog information and for processing the signals to linearly combine them to produce at least one output signal;

optical signal transmission means connecting said phase modulator means and said signal processor means for transmitting said optical signals; and utilization means connected to said signal processing means for using the output signal.

19. Signal transmission apparatus according to claim 18 wherein said source of light is a high powered laser.

20. Signal transmission apparatus according to claim 18 wherein said optical signal transmission means includes means for optically combining said phase modulated signals to produce an intensity modulated signal containing the analog information, and fiber optic means for transmitting optical signals between said phase modulator means and said signal processor means.

21. Signal transmission apparatus according to claim 20 wherein said means for combining optical signals is located at said signal processor means and phase modulated signals are transmitted by said fiber optic means over separate optical fiber paths to said means for combining signals.

22. Signal transmission apparatus according to claim 20 wherein signal stabilization means are connected in feedback relationship between said means for optically combining said phase modulated signals and said phase modulator means to produce bias signals to control said phase modulator.

23. Signal transmission apparatus according to claim 18 wherein frequency stabilization means is provided to said phase modulator means.

24. Signal transmission apparatus according to claim 23 wherein said stabilization means includes thermal stabilization means to control the temperature of said modulator and optical signal feedback means connected to said transmission means to provide bias signals at said modulator.

25. Signal transmission apparatus for transmitting a broad dynamic range of rf or microwave analog signals to remotely located utilization apparatus comprising:
  (a) a diode pumped laser to produce a beam of light;
  (b) an external phase modulator coupled to receive said beam of light and to receive analog signals, said modulator operated to produce optical signals in quadrature and at least one output signal containing the analog information; and
  (c) optical signal transmission means coupled to said phase modulator for transmitting the optical signals to remotely located utilization means, said optical signal transmission means including fiber optics for transmitting the output signal to the remotely located utilization means, said signal processor means including circuitry for converting the output signal into electrical signals in quadrature and combining the signals to produce linear output signals containing the broad dynamic range of the analog information, each of said output signals being used to drive the utilization means.

* * * * *